(12) United States Patent
Masai et al.

(10) Patent No.: US 11,529,731 B2
(45) Date of Patent: Dec. 20, 2022

(54) GEARING AND ROBOT

(71) Applicant: Seiko Epson Corporation, Toyko (JP)

(72) Inventors: Satoru Masai, Ina (JP); Yuya Kataoka, Azumino (JP); Nobuyuki Takehana, Matsumoto (JP); Yoshiyuki Soya, Matsumoto (JP)

(73) Assignee: SEIKO EPSON CORPORATION

( * ) Notice: Subject to any disclaimer, the term of this patent is extended or adjusted under 35 U.S.C. 154(b) by 71 days.

(21) Appl. No.: 17/227,454

(22) Filed: Apr. 12, 2021

(65) Prior Publication Data

US 2021/0316445 A1    Oct. 14, 2021

(30) Foreign Application Priority Data

Apr. 13, 2020   (JP) .............................. JP2020-071540

(51) Int. Cl.
*F16H 49/00*   (2006.01)
*B25J 9/10*    (2006.01)

(52) U.S. Cl.
CPC .......... *B25J 9/1025* (2013.01); *F16H 49/001* (2013.01); *F16H 2049/003* (2013.01)

(58) Field of Classification Search
CPC .................................................. F16H 49/001
USPC .......................................................... 74/640
See application file for complete search history.

(56) References Cited

U.S. PATENT DOCUMENTS

| | | | | |
|---|---|---|---|---|
| 10,344,848 B2* | 7/2019 | Kunugi | ................ | C10M 171/00 |
| 10,837,543 B2* | 11/2020 | Kusumoto | .......... | F16H 57/0464 |
| 11,085,509 B2* | 8/2021 | Shirouzu | ............. | F16H 55/0833 |
| 11,402,007 B2* | 8/2022 | Sakata | ................... | B25J 9/1025 |
| 2002/0178861 A1 | 12/2002 | Kobayashi | | |

FOREIGN PATENT DOCUMENTS

JP    2002-349681 A    12/2002

* cited by examiner

*Primary Examiner* — Ha Dinh Ho
(74) *Attorney, Agent, or Firm* — Harness, Dickey & Pierce, P.L.C.

(57) ABSTRACT

A gearing includes an internal gear, a flexible external gear partially meshing with the internal gear and relatively rotating about a rotation axis to the internal gear, and a wave generator provided inside of the external gear and moving a mesh position between the internal gear and the external gear in a circumferential direction about the rotation axis, wherein the external gear includes an external tooth having an external tooth surface, the external tooth surface has an external tooth convex pattern including a first convex portion and a second convex portion extending in directions crossing directions of a tooth trace of the external tooth and arranged adjacent to each other in the directions of the tooth trace, and a distance between the first convex portion and the second convex portion is from 80 μm to 520 μm.

8 Claims, 13 Drawing Sheets

GEARING AND ROBOT

The present application is based on, and claims priority from JP Application Serial Number 2020-071540, filed Apr. 13, 2020, the disclosure of which is hereby incorporated by reference herein in its entirety.

BACKGROUND

1. Technical Field

The present disclosure relates to a gearing and a robot.

2. Related Art

In a robot having a robot arm including at least one arm, for example, a joint part of the robot arm is driven by a motor to be pivoted. Rotation of the motor is reduced by a reducer and transmitted to the robot arm.

As the reducer, e.g. a wave gearing as disclosed in JP-A-2002-349681 is known. The wave gearing disclosed in JP-A-2002-349681 has a rigid internal gear in an annular shape, a flexible external gear in a cup shape placed inside of the internal gear, and a wave generator having an elliptical profile and fitted inside of the external gear.

The rigid internal gear has internal teeth and the flexible external gear has external teeth. The internal teeth and the external teeth can mesh with each other. Further, frictional contact portions between tooth surfaces of the gears are filled with grease having higher base oil viscosity and shear stability.

However, it is harder to hold the grease in the frictional contact portions depending on the surface condition of the tooth surfaces of the gears and shortening of the life of the wave gearing may be caused. Accordingly, a challenge is to extend the life of the wave gearing by improvements of the frictional contact portions.

SUMMARY

A gearing according to an application example of the present disclosure includes an internal gear, a flexible external gear partially meshing with the internal gear and relatively rotating about a rotation axis to the internal gear, and a wave generator provided inside of the external gear and moving a mesh position between the internal gear and the external gear in a circumferential direction about the rotation axis, wherein the external gear includes an external tooth having an external tooth surface, the external tooth surface has an external tooth convex pattern including a first convex portion and a second convex portion extending in directions crossing directions of a tooth trace of the external tooth and arranged adjacent to each other in the directions of the tooth trace, and a distance between the first convex portion and the second convex portion is from 80 μm to 520 μm.

A robot according to an application example of the present disclosure includes a first member, a second member pivoting relative to the first member, the gearing according to the above described application example transmitting a drive force for pivoting the second member relative to the first member, and a drive source outputting the drive force to the gearing.

DESCRIPTION OF EXEMPLARY EMBODIMENTS

As below, a gearing and a robot according to the present disclosure will be explained in detail according to preferred embodiments shown in the accompanying drawings.

1. Robot

First, a robot according to an embodiment will be briefly explained.

Figure 1:
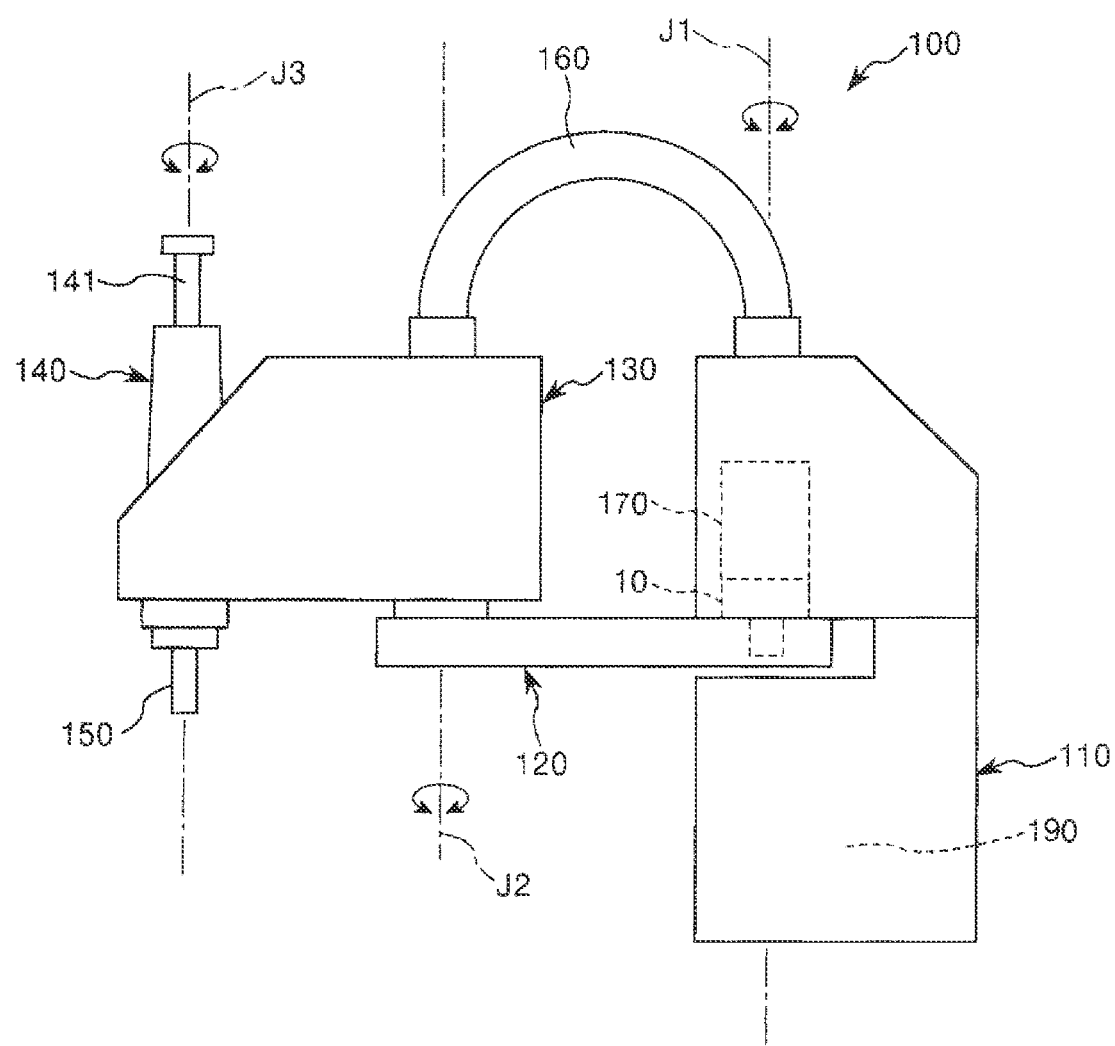
FIG. 1 is a side view showing a schematic configuration of a robot according to an embodiment.

FIG. 1 is a side view showing a schematic configuration of the robot according to the embodiment. Note that, hereinafter, for convenience of explanation, the upside in FIG. 1 is referred to as "upper" and the downside is referred to as "lower". Further, a base side in FIG. 1 is referred to as "proximal end side" and an opposite side thereto, i.e., an end effector side is referred to as "distal end side". "Directions" in this specification include both a direction toward one side along an axis and an opposite direction thereto.

The robot 100 shown in FIG. 1 is e.g. a robot used for work of feeding, removing, carrying, assembly, etc. of precision apparatuses and components forming the precision apparatuses. As shown in FIG. 1, the robot 100 has a base 110, a first arm 120, a second arm 130, a working head 140, an end effector 150, and a pipe 160. As below, the respective parts of the robot 100 will be sequentially and briefly explained.

The base 110 is fixed to e.g. a floor surface (not shown) by bolts or the like. Inside of the base 110, a control apparatus 190 that performs integrated control of the robot 100 is placed. Further, the first arm 120 is coupled to the base 110 pivotably about a first axis J1 along the vertical directions relative to the base 110. That is, the first arm 120 pivots relative to the base 110.

Here, within the base 110, a motor 170 (drive source) as a first motor that generates a drive force for pivoting the first arm 120, and a gearing 10 as a first reducer that reduces rotation by the drive force of the motor 170. An input shaft of the gearing 10 is coupled to a rotation shaft of the motor 170 and an output shaft of the gearing 10 is coupled to the first arm 120. Accordingly, when the motor 170 drives and the drive force thereof is transmitted to the first arm 120 via the gearing 10, the first arm 120 pivots about the first axis J1 relative to the base 110 within a horizontal plane. That is, the motor 170 is the drive source that outputs the drive force to the gearing 10.

The second arm 130 is coupled to the distal end portion of the first arm 120 pivotably about a second axis J2 relative to the first arm 120. Within the second arm 130, a second motor that generates a drive force for pivoting the second arm 130, and a second reducer that reduces rotation by the drive force of the second motor (not shown) are placed. The drive force of the second motor is transmitted to the second arm 130 via the second reducer, and thereby, the second arm 130 pivots about the second axis J2 relative to the first arm 120 within a horizontal plane.

The working head 140 is placed in the distal end portion of the second arm 130. The working head 140 has a spline shaft 141 inserted through a spline nut and a ball screw nut (not shown) coaxially placed in the distal end portion of the second arm 130. The spline shaft 141 is rotatable about a third axis J3 shown in FIG. 1 and movable in upward and downward directions relative to the second arm 130.

Within the second arm 130, a rotating motor and an elevating motor (not shown) are placed. The drive force of the rotating motor is transmitted to the spline nut by a drive force transmission mechanism (not shown) and, when the spline nut rotates forward and backward, the spline shaft 141 rotates forward and backward about the third axis J3 along the vertical directions.

On the other hand, the drive force of the elevating motor is transmitted to the ball screw nut by a drive force transmission mechanism (not shown) and, when the ball screw nut rotates forward and backward, the spline shaft 141 moves upward and downward.

The end effector 150 is coupled to the distal end portion of the spline shaft 141. The end effector 150 is not particularly limited to, but includes e.g. one that grips an object to be transported and one that processes an object to be processed.

A plurality of wires coupled to the respective electronic components placed within the second arm 130 e.g. the second motor, the rotating motor, the elevating motor, etc. are routed into the base 110 through the tubular pipe 160 coupling the second arm 130 and the base 110. Further, the plurality of wires are collected within the base 110, and thereby, routed to the control apparatus 190 placed within the base 110 with wires coupled to the motor 170 and an encoder (not shown).

As described above, the robot 100 includes the base 110 as a first member, the first arm 120 as a second member provided pivotably relative to the base 110, the gearing 10 that transmits the drive force from one side to the other side of the base 110 and the first arm 120, and the motor 170 as the drive source that outputs the drive force to the gearing 10.

Note that the first arm 120 and the second arm 130 may be collectively regarded as "second member". Or, "second member" may further include the working head 140 and the end effector 150 in addition to the first arm 120 and the second arm 130.

In the embodiment, the first reducer includes the gearing 10, however, the second reducer may include the gearing 10 or both the first reducer and the second reducer may include the gearings 10. When the second reducer includes the gearing 10, the first arm 120 may be regarded as "first member" and the second arm 130 may be regarded as "second member".

Further, in the embodiment, the motor 170 and the gearing 10 are provided in the base 110, however, the motor 170 and the gearing 10 may be provided in the first arm 120. In this case, the output shaft of the gearing 10 may be coupled to the base 110.

2. Gearing According to First Embodiment

Next, a gearing according to a first embodiment will be explained.

Figure 2:
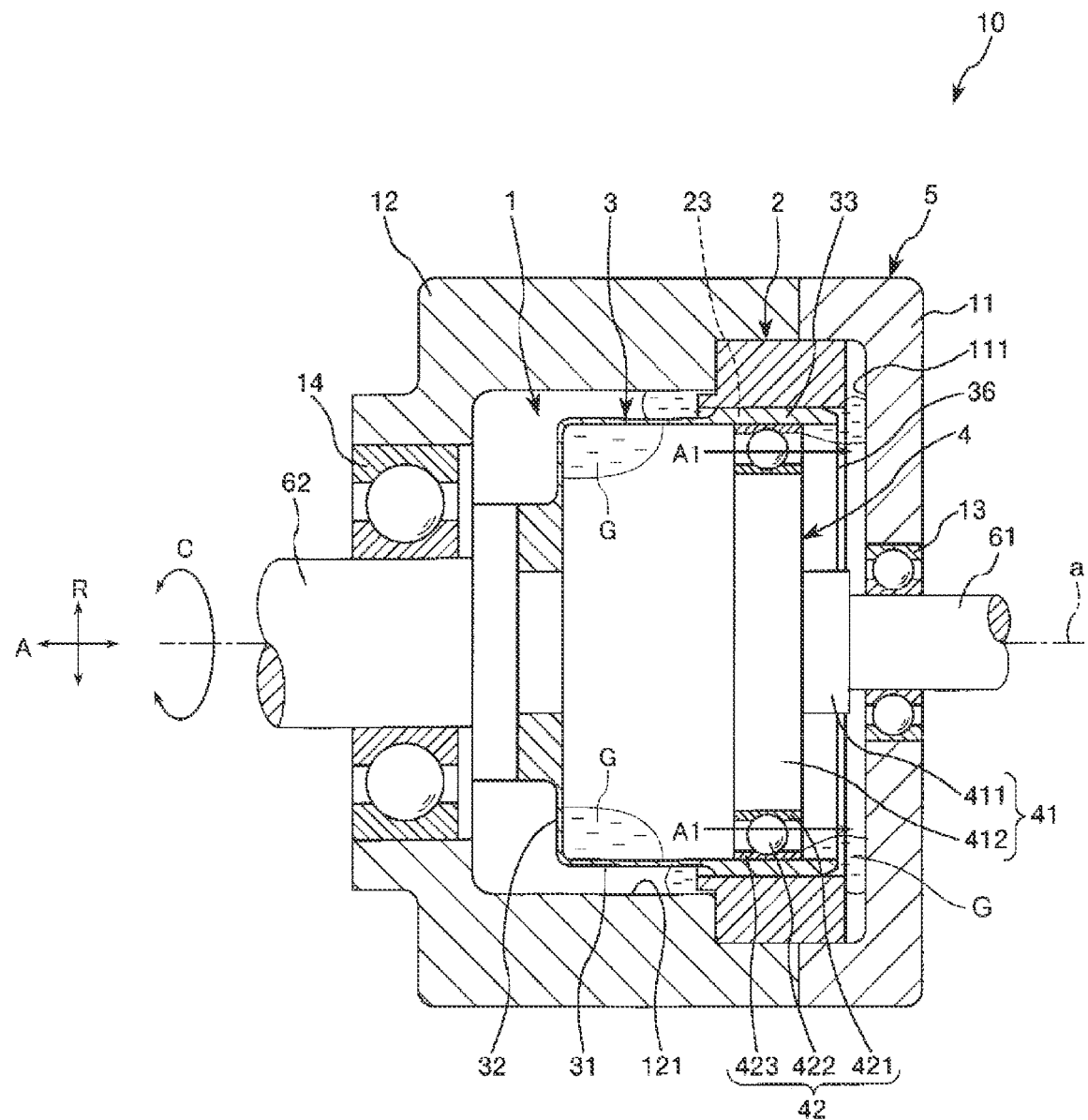
FIG. 2 is a longitudinal sectional view showing a gearing according to a first embodiment.
Figure 3:
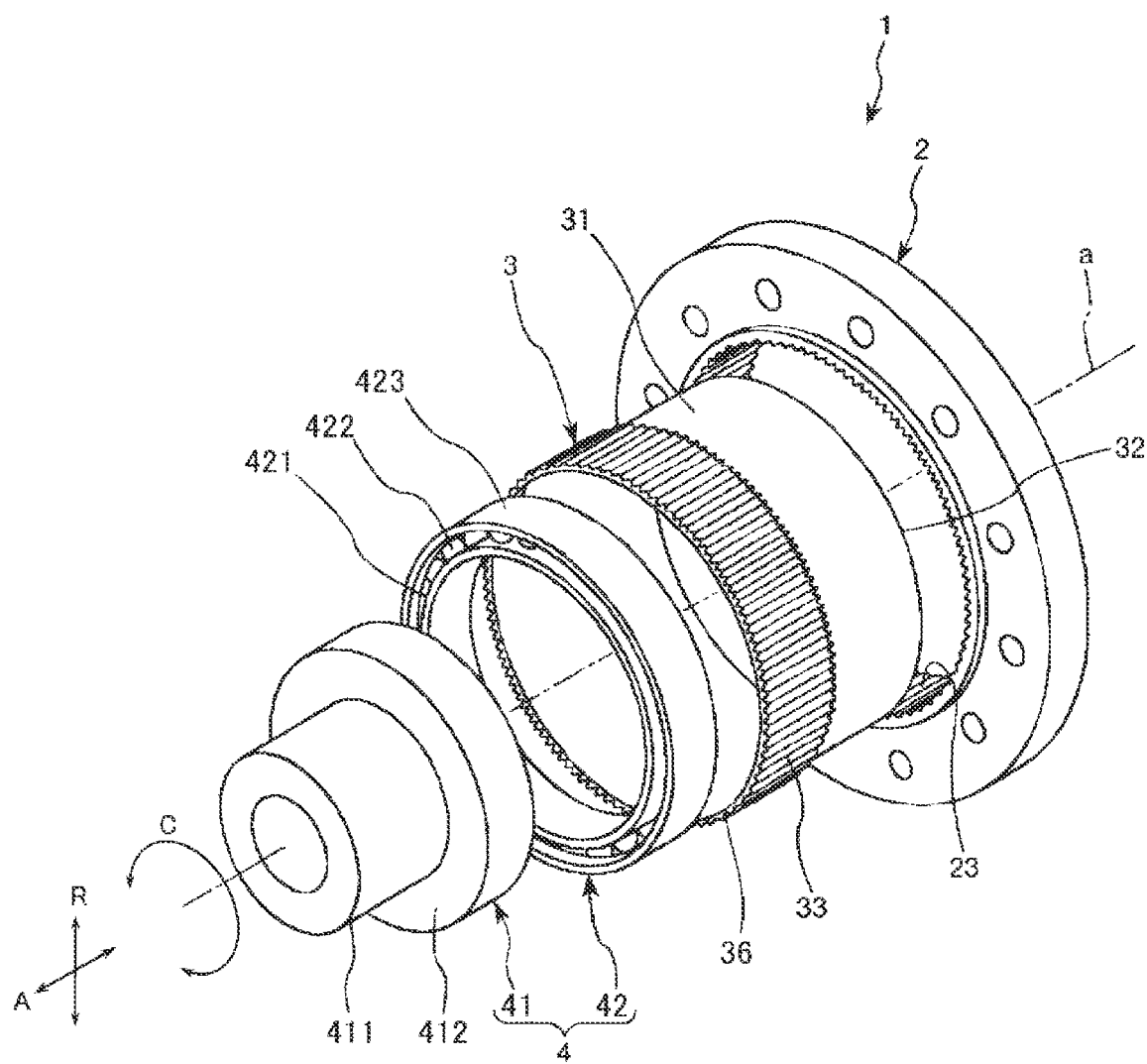
FIG. 3 is an exploded perspective view of a gearing main body shown in FIG. 2.
Figure 4:
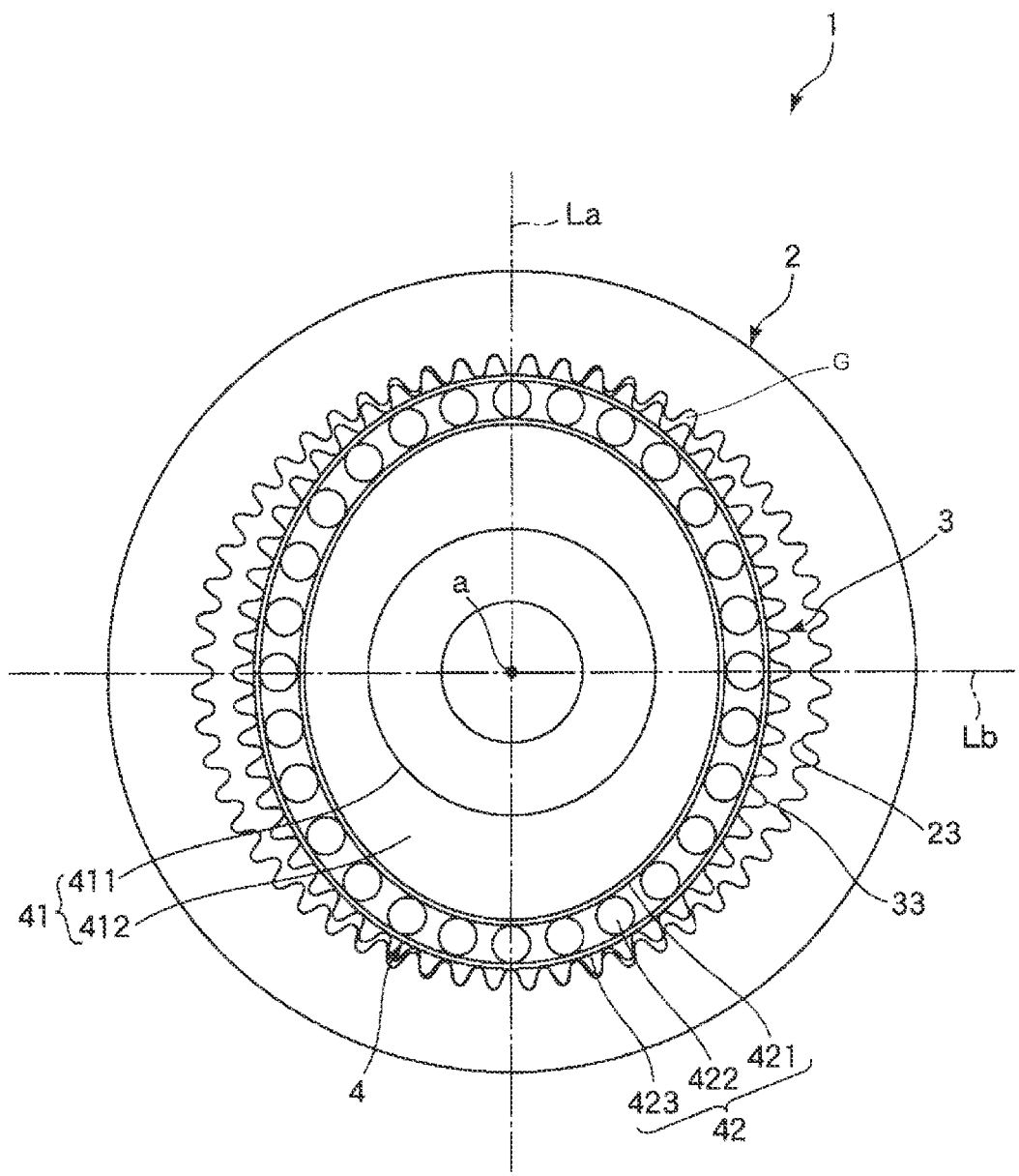
FIG. 4 is a front view of the gearing main body shown in FIG. 2 as seen from an axial line a direction.
Figure 5:
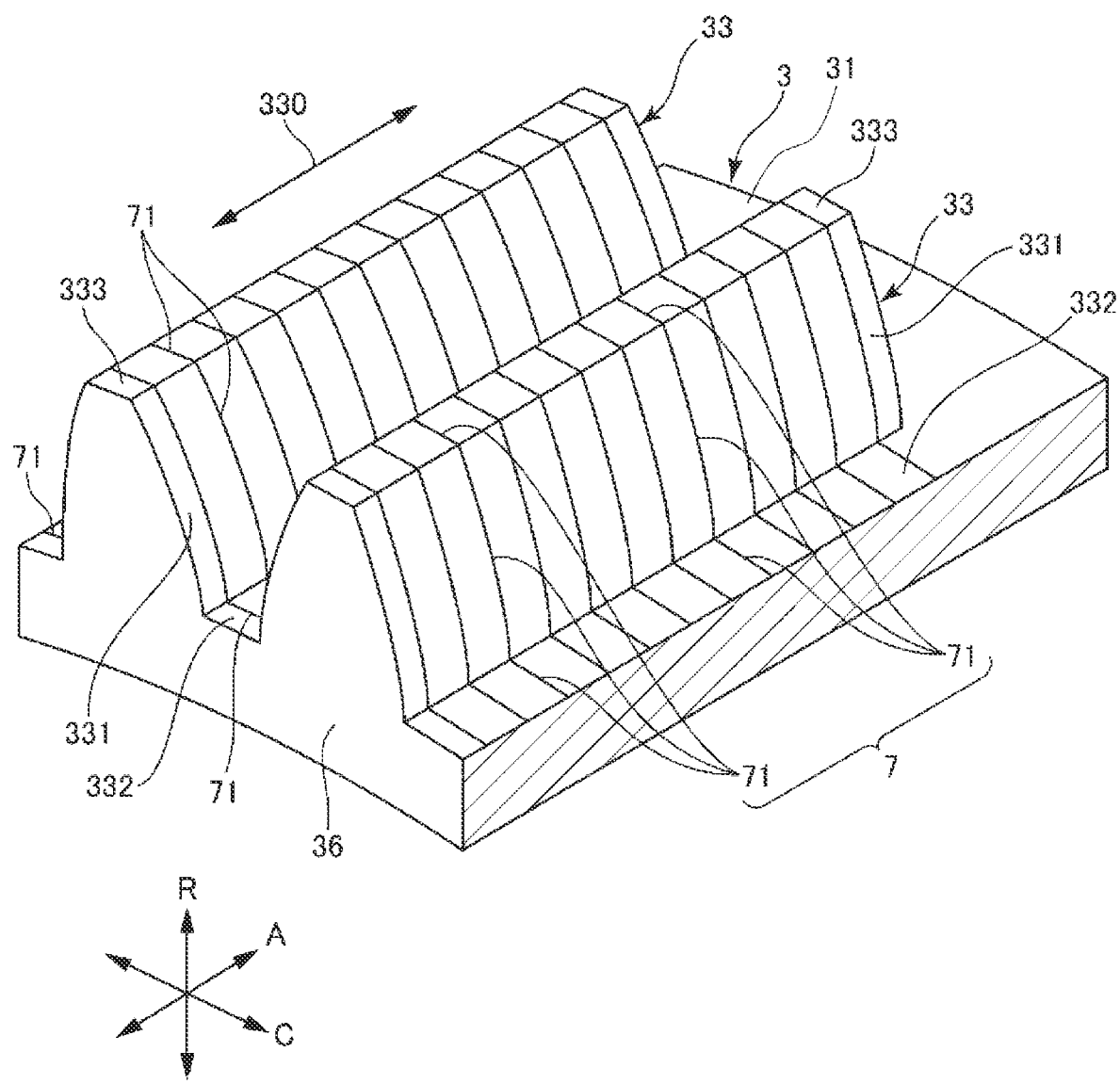
FIG. 5 is a partially enlarged view of a vicinity of external teeth of a flexible gear shown in FIG. 3.
Figure 6:
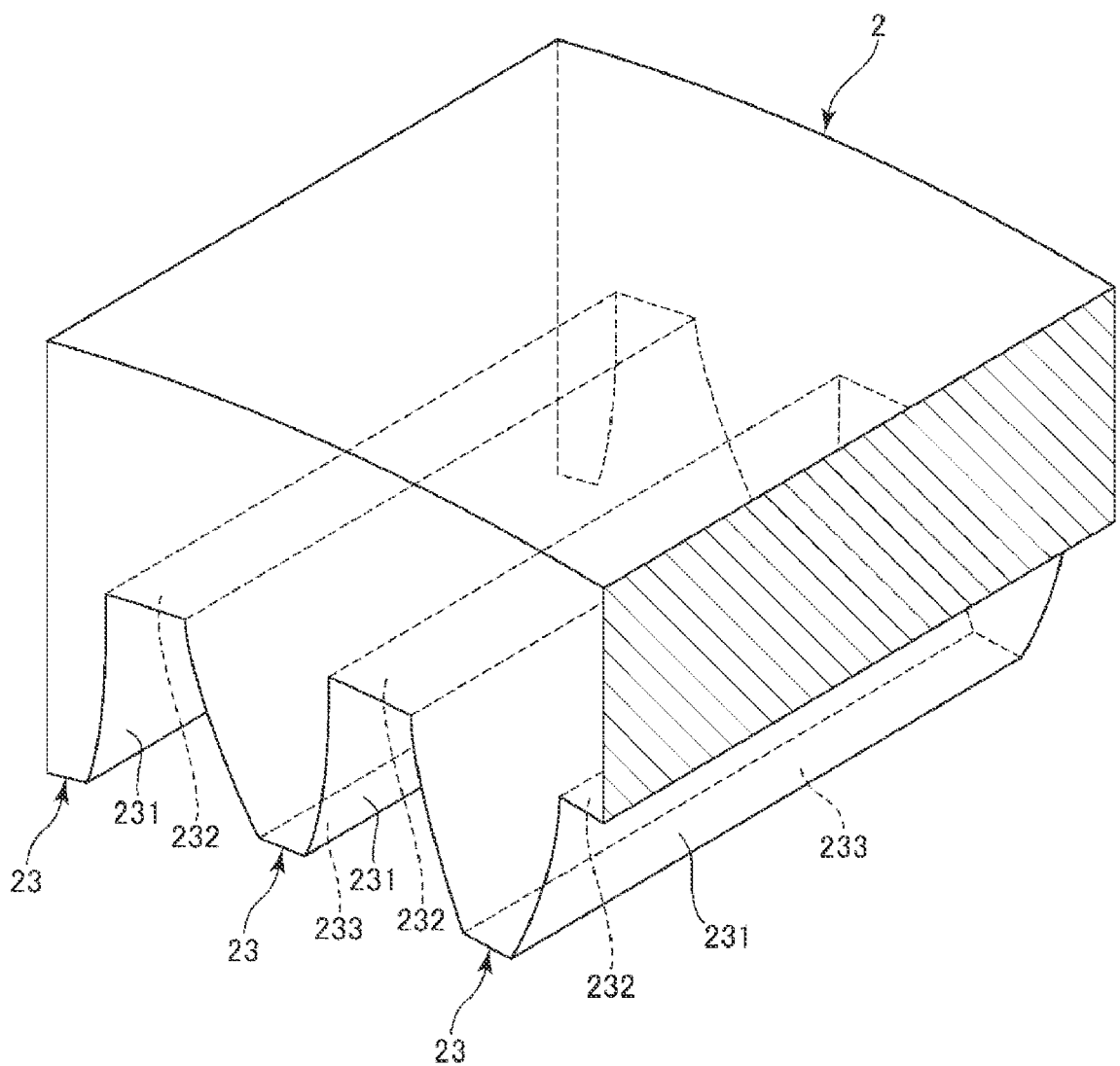
FIG. 6 is a partially enlarged view of a vicinity of internal teeth of a rigid gear shown in FIG. 3.
Figure 7:
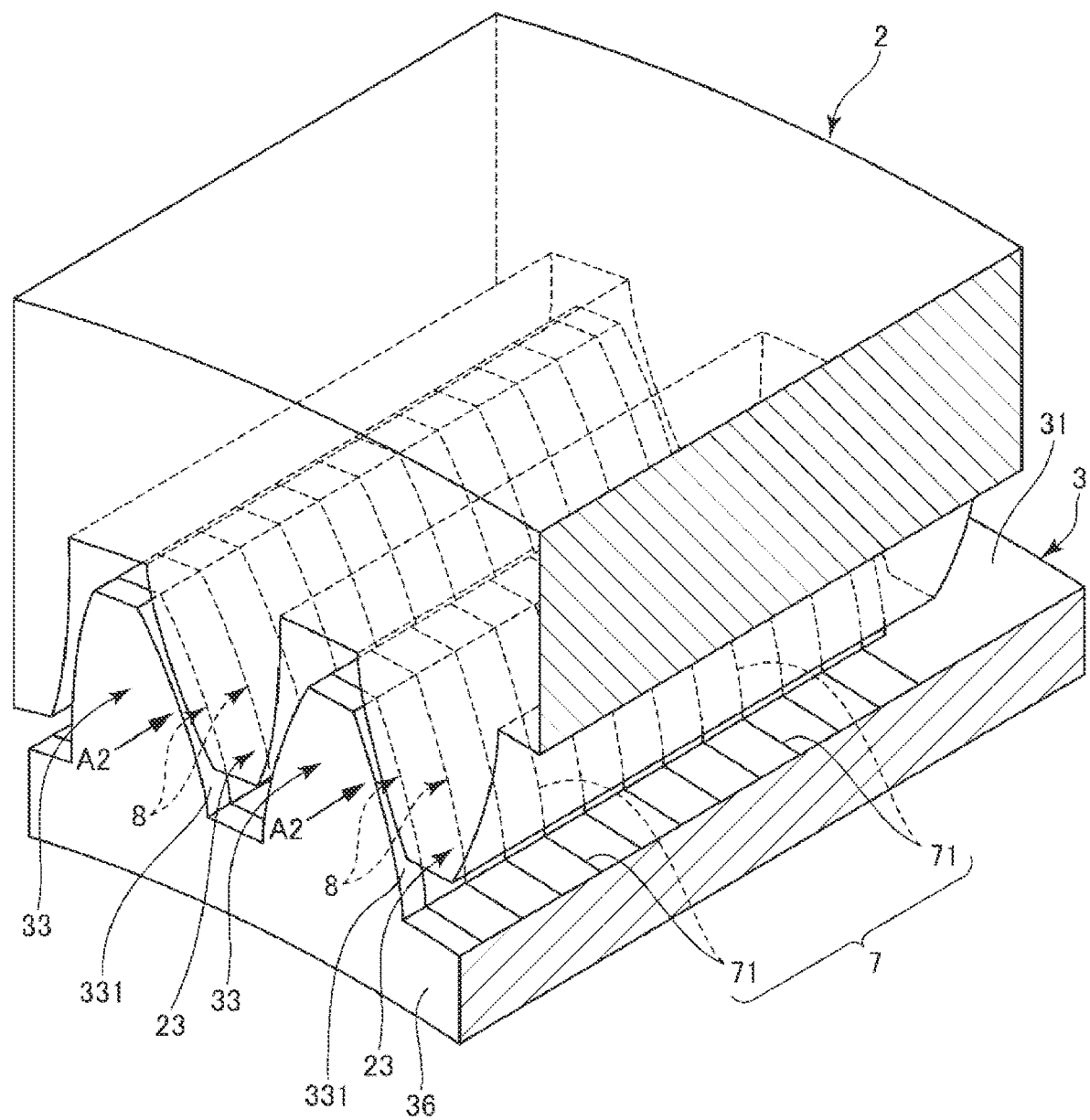
FIG. 7 is a partially enlarged perspective view showing a state in which the internal teeth of the rigid gear and the external teeth of the flexible gear shown in FIG. 3 mesh with each other.
Figure 7:
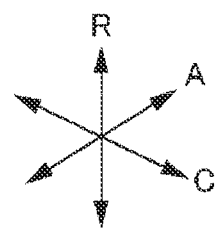
Figure 8:
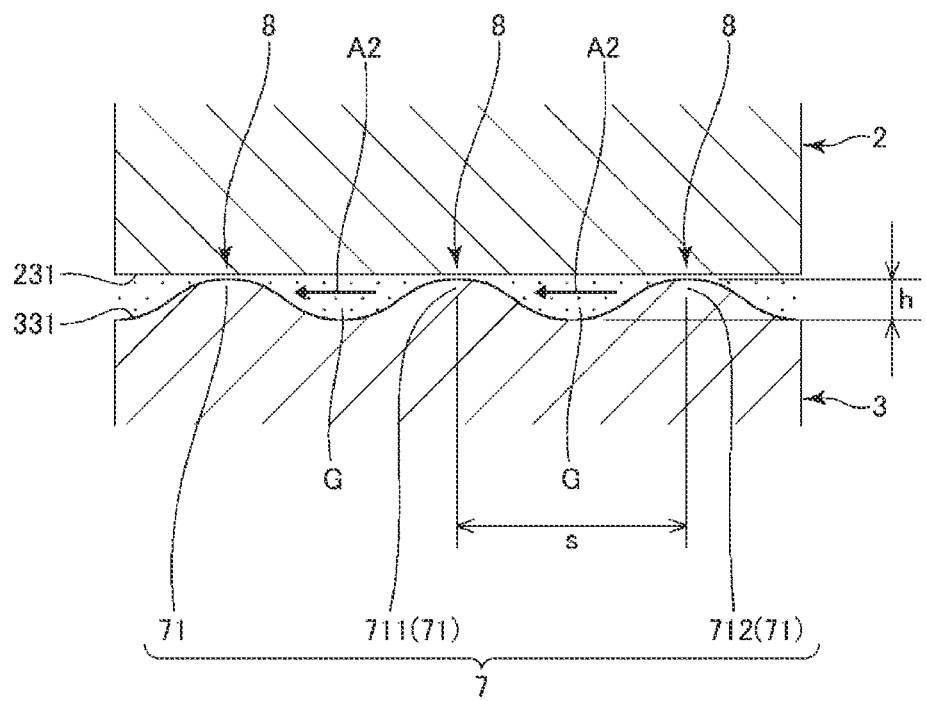
FIG. 8 is a partially enlarged sectional view of a mesh position in FIG. 7.

FIG. 2 is a longitudinal sectional view showing the gearing according to the first embodiment. FIG. 3 is an exploded perspective view of a gearing main body shown in FIG. 2. FIG. 4 is a front view of the gearing main body shown in FIG. 2 as seen from an axial line a direction. FIG. 5 is a partially enlarged view of a vicinity of external teeth 33 of a flexible gear 3 shown in FIG. 3. FIG. 6 is a partially enlarged view of a vicinity of internal teeth 23 of a rigid gear 2 shown in FIG. 3. FIG. 7 is a partially enlarged perspective view showing a state in which the internal teeth 23 of the rigid gear 2 and the external teeth 33 of the flexible gear 3 mesh with each other. FIG. 8 is a partially enlarged sectional view of a mesh position in FIG. 7. Note that, in the respective drawings, for convenience of explanation, dimensions of the respective parts are shown with appropriate exaggeration as necessary and dimensional ratios between the respective parts are not necessarily the same as the real dimensional ratios.

The gearing 10 shown in FIG. 2 is a wave gearing and used as e.g. a reducer. The gearing 10 has a gearing main body 1 and a case 5 housing the gearing main body 1 and these are integrated. Here, a lubricant G is placed within the case 5 of the gearing 10. As below, the respective parts of the gearing 10 will be explained. Note that the case 5 may be provided as necessary or omitted.

2.1. Gearing Main Body

The gearing main body 1 has the rigid gear 2 as an internal gear, the flexible gear 3 as a cup-shaped external gear placed inside of the rigid gear 2, and a wave generator 4 placed inside of the flexible gear 3.

In the embodiment, the rigid gear 2 is coupled to the base 110 (first member) of the above described robot 100 via the case 5, the flexible gear 3 is coupled to the first arm 120 (second member) of the above described robot 100, and the wave generator 4 is coupled to the rotation shaft of the motor 170 placed in the base 110 of the above described robot 100.

When the rotation shaft of the motor 170 rotates, the wave generator 4 rotates at the same rotation speed as that of the rotation shaft of the motor 170. The rigid gear 2 and the flexible gear 3 are different in the number of teeth from each other, and thereby, the gears relatively rotate about an axial line a while a mesh position with each other moves in a circumferential direction due to the difference in the number of teeth. In the embodiment, the number of teeth of the rigid gear 2 is larger than the number of teeth of the flexible gear 3, and thus, the flexible gear 3 may be rotated at a lower rotation speed than the rotation speed of the rotation shaft of the motor 170. That is, the reducer with the wave generator 4 at the input shaft side and the flexible gear 3 at the output shaft side may be realized.

Note that, depending on the form of the case 5, even when the flexible gear 3 is coupled to the base 110 and the rigid gear 2 is coupled to the first arm 120, the gearing 10 may be used as a reducer. Or, even when the rotation shaft of the motor 170 is coupled to the flexible gear 3, the gearing 10 may be used as a reducer. In this case, the wave generator 4 may be coupled to the base 110 and the rigid gear 2 may be coupled to the first arm 120. Or, when the gearing 10 is used as an increaser, that is, when the flexible gear 3 is rotated at a higher rotation speed than the rotation speed of the rotation shaft of the motor 170, the above described relationship between the input side and the output side may be inverted.

As shown in FIGS. 2, 3, and 6, the rigid gear 2 is formed by a rigid body that does not substantially bend in the radial direction, a ring-shaped internal gear having the internal teeth 23. In the embodiment, the rigid gear 2 is a spur gear. That is, the internal teeth 23 have tooth traces parallel to the axial line a (axial directions A). Note that the tooth traces of the internal teeth 23 may be inclined relative to the axial line a. That is, the rigid gear 2 may be a helical gear or a double-helical gear.

As shown in FIGS. 2, 3, and 7, the flexible gear 3 is inserted into the rigid gear 2. The flexible gear 3 is a gear having flexibility flexurally deformable in the radial direction, and also an external gear having the external teeth 33 meshing with part of the internal teeth 23 of the rigid gear 2. As shown in FIG. 5, the external teeth 33 have tooth traces 330 parallel to the axial line a (axial directions A). The number of teeth of the flexible gear 3 is smaller than the number of teeth of the rigid gear 2. The numbers of teeth of the flexible gear 3 and the rigid gear 2 are different from each other, and thereby, the reducer may be realized.

In the embodiment, the flexible gear 3 has the cup shape with an opening part 36 in which one end in the axial line a direction, i.e., an end portion at the right side in FIG. 2 opens and the external teeth 33 are formed from the opening part 36 toward the other end. Here, the flexible gear 3 has a tubular barrel part 31 around the axial line a, and a bottom part 32 coupled to the other end portion of the barrel part 31 in the axial line a direction. Thereby, the opening part 36 provided with the external teeth 33 bends in the radial direction more easily than the bottom part 32 and good flexible meshing of the flexible gear 3 with the rigid gear 2 may be realized. Further, for example, rigidity of the bottom part 32 to which a shaft 62 as an output shaft is coupled may be increased. Accordingly, the gearing 10 is suitable for application to repeated reversals with a very small backlash, and may obtain high torque capacity because a rate between the numbers of teeth meshing at the same time is larger and a force applied to one tooth is smaller.

As shown in FIGS. 2 and 3, the wave generator 4 is placed inside of the flexible gear 3 and rotatable about the axial line a. Further, the wave generator 4 deforms the lateral section of the opening part 36 of the flexible gear 3 into an elliptical shape or elongated circular shape and meshes the external teeth 33 of the flexible gear 3 with the internal teeth 23 of the rigid gear 2. A long axis of the elliptical shape or elongated circular shape is La and a short axis is Lb. The flexible gear 3 and the rigid gear 2 are meshed with each other inside and outside rotatably about the same axial line a.

In the embodiment, the wave generator 4 has a cam 41 and a bearing 42 attached to an outer circumference of the cam 41. The cam 41 has a shaft portion 411 rotating about the axial line a and a cam portion 412 projecting from one end of the shaft portion 411 toward the outside.

For example, a shaft 61 as an input shaft is coupled to the shaft portion 411. The outer circumferential surface of the cam portion 412 has an elliptical shape or elongated circular shape as seen from a direction along the axial line a. The bearing 42 has flexible inner ring 421 and outer ring 423 and a plurality of balls 422 placed between the rings. Here, the inner ring 421 is fitted to the outer circumferential surface of the cam portion 412 of the cam 41 and elastically deforms in an elliptical shape or elongated circular shape along the outer circumferential surface of the cam portion 412. With the deformation, the outer ring 423 also elastically deforms in an elliptical shape or elongated circular shape. An outer circumferential surface of the inner ring 421 and an inner circumferential surface of the outer ring 423 respectively have track surfaces that guide and roll the plurality of balls 422 along the circumferential direction. Furthermore, the plurality of balls 422 are held by a holder (not shown) to keep fixed intervals between each other in the circumferential direction. Note that grease (not shown) is placed within the bearing 42. The grease may be the same as or different from the lubricant G, which will be described later.

In the wave generator 4, the orientation of the cam portion 412 changes with the rotation of the cam 41 about the axial line a, and the outer circumferential surface of the outer ring 423 also deforms with the change and the mesh position between the rigid gear 2 and the flexible gear 3 with each other is moved in the circumferential direction.

The rigid gear 2, the flexible gear 3, and the wave generator 4 are respectively formed using metal materials including iron-based materials such as cast iron, nickel-chromium-molybdenum steel, chromium-molybdenum steel (SCM), maraging steel, and precipitation-hardened stainless steel.

Particularly, the flexible gear 3 is preferably formed using nickel-chromium-molybdenum steel as a principal material. The nickel-chromium-molybdenum steel becomes tough steel by appropriate heat treatment and has good mechanical characteristics including a fatigue strength, and is suitable for the constituent material of the flexible gear 3 on which stress repeatedly acts.

The nickel-chromium-molybdenum steel includes e.g. steel materials of the types specified in JIS G 4053:2016. Specifically, the nickel-chromium-molybdenum steel includes steel materials of SNCM220, SNCM240, SNCM415, SNCM420, SNCM431, SNCM439, SNCM447, SNCM616, SNCM625, SNCM630, SNCM815 as codes defined in the JIS standards. It is particularly preferable to use SNCM439 of the materials as the nickel-chromium-molybdenum steel used for the constituent material of the flexible gear 3 in view of good mechanical characteristics.

Note that the constituent material of the flexible gear 3 may contain another material than nickel-chromium-molybdenum steel. That is, the flexible gear 3 may be formed using a composite material of nickel-chromium-molybdenum steel and another material.

On the other hand, the rigid gear 2 as the internal gear is preferably formed using nodular graphite cast iron. The graphite particles of the nodular graphite cast iron serve as a lubricant and the internal teeth 23 of the rigid gear 2 are harder to adhere. Accordingly, wearing of the rigid gear 2 may be reduced and the life of the rigid gear 2 may be extended.

The nodular graphite cast iron includes e.g. materials of the types specified in JIS G 5502:2001. Specifically, the nodular graphite cast iron includes FCD350-22, FCD350-22L, FCD400-18, FCD400-18L, FCD400-15, FCD400-10, FCD450-10, FCD500-7, FCD600-3, FCD700-2, FCD800-2, FCD900 or the like as codes defined in the JIS standards.

2.2. Case

The case 5 shown in FIG. 2 has a lid body 11 substantially in a plate shape supporting the shaft 61 via a bearing 13 and a main body 12 in a cup shape supporting the shaft 62 via a bearing 14. Here, the lid body 11 and the main body 12 are coupled to form a space and the above described gearing main body 1 is housed in the space. Further, the rigid gear 2 of the above described gearing main body 1 is fixed to at least one of the the lid body 11 and the main body 12 by e.g. screws or the like.

An inner wall surface 111 of the lid body 11 has a shape spreading in a direction perpendicular to the axial line a to cover the opening part 36 of the flexible gear 3. Further, an inner wall surface 121 of the main body 12 has a shape along the outer circumferential surface and the bottom surface of the flexible gear 3. The case 5 is fixed to the base 110 of the above described robot 100. Here, the lid body 11 may be formed separately from the base 110 and fixed to the base 110 by e.g. screws or the like or integrated with the base 110. A constituent material of the case 5 including the lid body 11 and the main body 12 is not particularly limited to, but includes e.g. a metal material and a ceramics material.

2.3. Lubricant

The lubricant G is e.g. grease, i.e., a semisolid lubricant and placed at least between the rigid gear 2 and the flexible gear 3 as a mesh portion or between the flexible gear 3 and the wave generator 4 as a contact and slide portion. Hereinafter, these mesh portion and the contact and slide portion are referred to as "lubricated portion". The lubricant G is supplied to the lubricated portion, and thereby, friction of the lubricated portion may be reduced.

The lubricant G contains e.g. a base oil, a thickener, and an organomolybdenum compound.

The base oil includes e.g. paraffin-based or naphthene-based mineral oil and synthetic oil such as polyolefin, ester, or silicone, and one of these may be used singly or two or more may be combined and used. The thickener includes e.g. soap such as calcium soap, calcium complex soap, sodium soap, aluminum soap, lithium soap, or lithium complex soap and non-soap such as polyurea, sodium terephthalamate, polytetrafluoroethylene (PTFE), organic bentonite, or silica gel, and one of these may be used singly or two or more may be combined and used. The lubricant G containing the base oil and the thickener as compositions as described above exerts a lubricating action because three-dimensional structures formed by the thickener are complexly entangled and hold the base oil and the held base oil is seeped out little by little.

2.4. Convex Pattern of Flexible Gear

As shown in FIGS. 3 and 4, the flexible gear 3 is the cup-shaped gear having the many external teeth 33. As shown in FIG. 5, each external tooth 33 has an external tooth surface 331, and a tooth bottom surface 332 and a tooth end surface 333 coupled to the external tooth surface 331. Of the surfaces, as shown in FIG. 5, at least the external tooth surface 331 has a plurality of convex portions 71. The respective convex portions 71 extend in directions crossing a tooth trace 330 of the external tooth 33 e.g. directions having a component in radial directions R. Further, the respective convex portions 71 extend substantially in parallel to one another and arranged in the axial directions A within the external tooth surface 331. An external tooth convex pattern 7 shown in FIG. 5 is formed by the plurality of convex portions 71.

Note that the convex portions 71 may not necessarily be completely parallel to one another. Or, the convex portions 71 may cross one another or the convex portions 71 may be branched in the middle. Or, the directions in which the convex portions 71 extend may be any directions crossing the tooth trace 330, not limited to the illustrated directions. Or, the convex portions 71 may bend or end in the middle.

The convex portion 71 refers to a portion projecting from the surrounding part. In FIG. 5, the end part of the convex portion 71 linearly extending to cross the tooth trace 330 is shown by a line. The convex portion 71 is also called a ridge. Note that the projection height of the convex portion 71 is very low compared to the size of the external tooth 33 and the height of the convex portion 71 is not shown in FIGS. 5 and 7.

On the other hand, as shown in FIGS. 3 and 4, the rigid gear 2 is the ring-shaped gear having the many internal teeth 23. As shown in FIG. 6, each internal tooth 23 has an internal tooth surface 231, and a tooth bottom surface 232 and a tooth end surface 233 coupled to the internal tooth surface 231. The internal tooth surface 231 of the internal tooth 23 of the rigid gear 2 is not particularly limited, but may be a flat surface as shown in FIG. 8 or may have an internal tooth convex pattern including a plurality of convex portions, which will be described later.

Here, as shown in FIG. 7, part of the many external teeth 33 of the flexible gear 3 mesh with the internal teeth 23 of the rigid gear 2. In the mesh position, as shown in FIG. 8, the external tooth surface 331 and the internal tooth surface 231 face close to and partially contact each other. Torque is transmitted via contact points 8.

Large frictional forces are generated at the contact points 8 between the external tooth surface 331 and the internal tooth surface 231. The frictional forces cause deterioration of the external tooth surface 331 and the internal tooth surface 231. Accordingly, as shown in FIG. 8, it is necessary to provide lubrication performance by supplying the lubricant G to the contact points 8 and around the points to reduce the frictional forces.

For the purpose, for example, the lubricant G placed inside of the flexible gear 3 is gradually supplied to the mesh position. Thereby, the lubrication performance at the contact points 8 between the external tooth surface 331 and the internal tooth surface 231 is increased, and smooth torque transmission is realized and the life is extended.

Specifically, as shown in FIG. 2, there is a space inside of the flexible gear 3 and the lubricant G is placed in the space. The lubricant G flows to the outside from the opening part 36 of the flexible gear 3 via the bearing 42 as shown by arrows A1 in FIG. 2. The lubricant G flowing to the outside of the flexible gear 3 flows into between the external tooth surface 331 and the internal tooth surface 231 as shown by arrows A2 in FIGS. 7 and 8. Therefore, the lubricant G is held between the external tooth surface 331 and the internal tooth surface 231, and thereby, the lubrication performance of the contact points 8 is kept in good condition.

As described above, the plurality of convex portions 71 are provided in the external tooth surface 331. The convex portions 71 determine retainability of the lubricant G in the external tooth surface 331. That is, the convex portions 71 extend in the directions crossing the tooth trace 330, and the flow of the lubricant G in the direction of the arrows A2 may be optimized by adjustment of the density.

Specifically, FIG. 8 is the sectional view in the vicinity of the contact points 8 shown in FIG. 7, and the adjacent two of the plurality of convex portions 71 shown in FIG. 8 are referred to as "first convex portion 711" and "second convex portion 712". In this regard, a distance between the first convex portion 711 and the second convex portion 712 is S [μm] in the directions in which the convex portions 71 are arranged. The distance S is obtained as a distance between an end part of the first convex portion 711 and an end part of the second convex portion 712. In the embodiment, the distance S is set from 80 μm to 520 μm.

That is, the gearing 10 according to the embodiment has the rigid gear 2 (internal gear), the flexible gear 3 (external gear) including the external teeth 33 having the external tooth surfaces 331, and the wave generator 4 provided inside of the flexible gear 3. The flexible gear 3 is the gear partially meshing with the rigid gear 2, rotating about the axial line a (rotation axis) relative to the rigid gear 2, and having flexibility. The wave generator 4 moves the mesh position between the rigid gear 2 and the flexible gear 3 in the circumferential direction about the axial line a.

The external tooth surface 331 has the external tooth convex pattern 7 including the first convex portion 711 and the second convex portion 712 extending in the directions crossing the directions of the tooth trace 330 of the external tooth 33 and arranged adjacent to each other in the directions of the tooth trace 330. Further, the distance S between the first convex portion 711 and the second convex portion 712 is from 80 µm to 520 µm.

According to the configuration, the density of the convex portions 71 is optimized and the flow of the lubricant G shown by the arrows A2 in FIGS. 7 and 8 may be appropriately regulated. That is, the convex portions 71 extend in the directions crossing the flow of the lubricant G, and thus, resistance to the flow of the lubricant G may be controlled by optimization of the density of the convex portions 71. The distance S is set in the above described range, and thereby, a prompt flow of the lubricant G present between the external tooth surface 331 and the internal tooth surface 231 and difficulty in flow of the lubricant G flowing as shown by the arrows A2 into between the external tooth surface 331 and the internal tooth surface 231 may be suppressed. Thereby, the lubricant G may be easily held between the external tooth surface 331 and the internal tooth surface 231 and the lubrication performance may be maintained for a long period. As a result, the life of the gearing 10 may be extended.

Note that, in the external tooth surface 331, at least a part thereof, specifically, in an area having a length equal to or larger than 500 µm in the extension directions of the convex portions 71, it is necessary that the distance S between the first convex portion 711 and the second convex portion 712 is within the above described range. Of the entire area of the external tooth surface 331, the distance S is preferably within the above described range in an area equal to or larger than 30%, the distance S is more preferably within the above described range in an area equal to or larger than 50%, and the distance S is even more preferably within the above described range in an area equal to or larger than 65%. Thereby, the above described effect may be obtained more reliably.

The distance S is obtained by measurement of the distance between the end part of the first convex portion 711 and the end part of the second convex portion 712 in the axial directions A. Note that the distance S may be an average value of the measurement values at ten or more points distributed over the entire length of the first convex portion 711.

Further, it is preferable that the distance S between the first convex portion 711 and the second convex portion 712 is from 160 µm to 510 µm. Thereby, the life of the gearing 10 may be further extended.

Furthermore, it is preferable that the distance S between the first convex portion 711 and the second convex portion 712 is from 300 µm to 450 µm. Thereby, the life of the gearing 10 may be especially extended.

Note that, when the distance S is smaller than the above described lower limit value, the lubricant G is easily held between the external tooth surface 331 and the internal tooth surface 231, but harder to enter from outside. Accordingly, new supply of the lubricant G is short, and the lubrication performance tends to be lower and durability of the gearing 10 and drivability such as torque transmission efficiency are lower. On the other hand, when the distance S exceeds the above described upper limit value, the lubricant G easily flows out and the retainability of the lubricant G over a long period is degraded.

Figure 9:
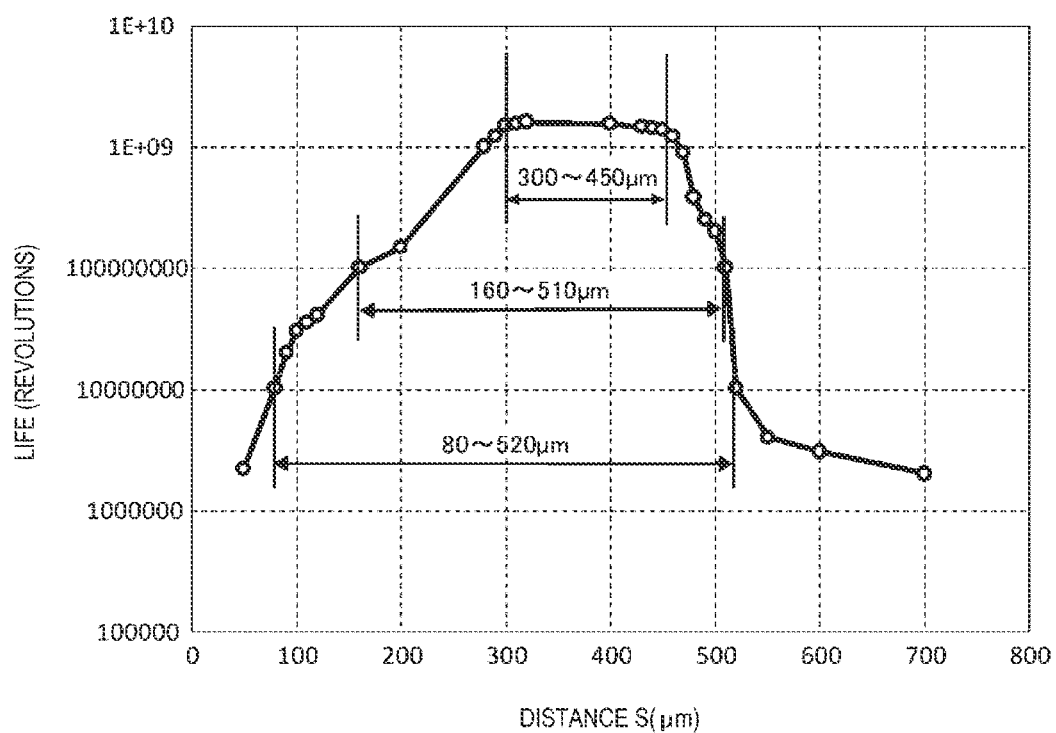
FIG. 9 is a graph showing a relationship between a distance and a life of the gearing.

Here, FIG. 9 is a graph showing a relationship between the distance S and the life of the gearing 10. The horizontal axis in FIG. 9 indicates the distance S. The vertical axis in FIG. 9 is a logarithmic axis that indicates the life of the gearing 10.

As shown in FIG. 9, when the distance S is in a range smaller than 80 µm and a range larger than 520 µm, it is difficult to secure a life of about ten million times in the gearing 10. On the other hand, as described above, when the distance S is in the range from 80 µm to 520 µm, the life of about ten million times may be secured. The life corresponds to about one year when the number of times is converted to a continuous operating time based on an operation pattern example of the robot 100 including the gearing 10. That is, the life of about ten million times in the gearing 10 is a life in which the robot 100 can be continuously operated for 24 hours a day for one year. The life is the minimum life required as the life of the robot 100, and the life of about ten million times of the gearing 10 is sufficient as the minimum life that the gearing 10 should have.

Note that, for example, the life of the gearing 10 is obtained in the following manner.

First, torque is input to the input shaft of the gearing 10 at a number of revolutions of 3000 rpm and with average load torque of 50 Nm and peak torque of 60 Nm, and continuous operation is performed. Then, the number of revolutions of the input shaft until the gearing 10 is broken is counted. The number of revolutions obtained in the above described manner is used as the life of the gearing 10.

As shown in FIG. 9, when the distance S is in the range from 160 µm to 510 µm, a life of about a hundred million times may be secured in the gearing 10. The life is a more sufficient life as the life of the robot 100 including the gearing 10.

Furthermore, as shown in FIG. 9, when the distance S is in the range from 300 µm to 450 µm, a life of about a billion times may be secured in the gearing 10. The life is an especially sufficient life as the life of the robot 100 including the gearing 10.

Figure 10:
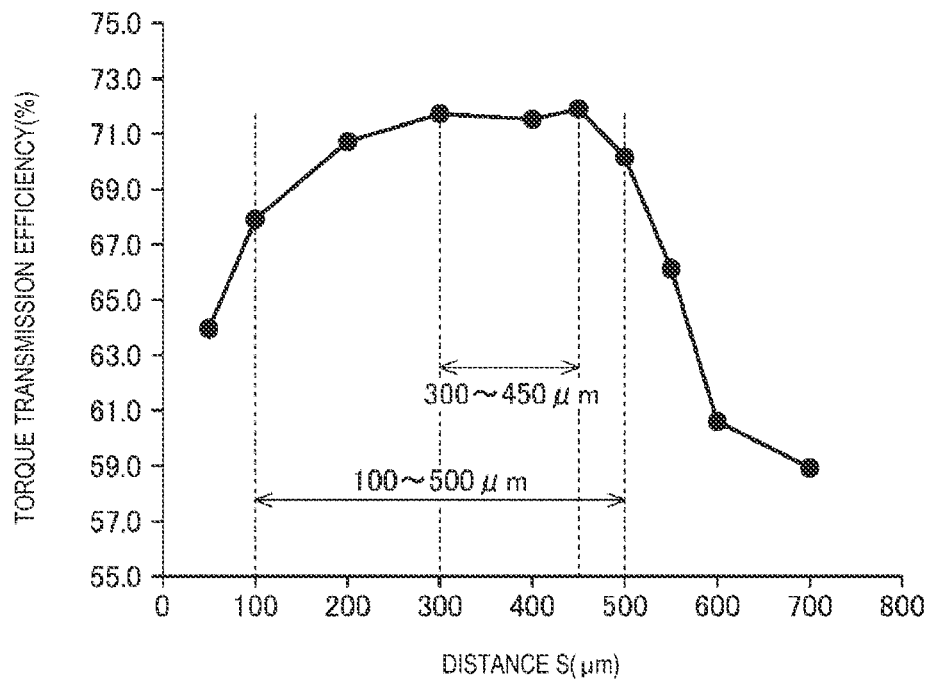
FIG. 10 is a graph showing a relationship between the distance and torque transmission efficiency.
Figure 11:
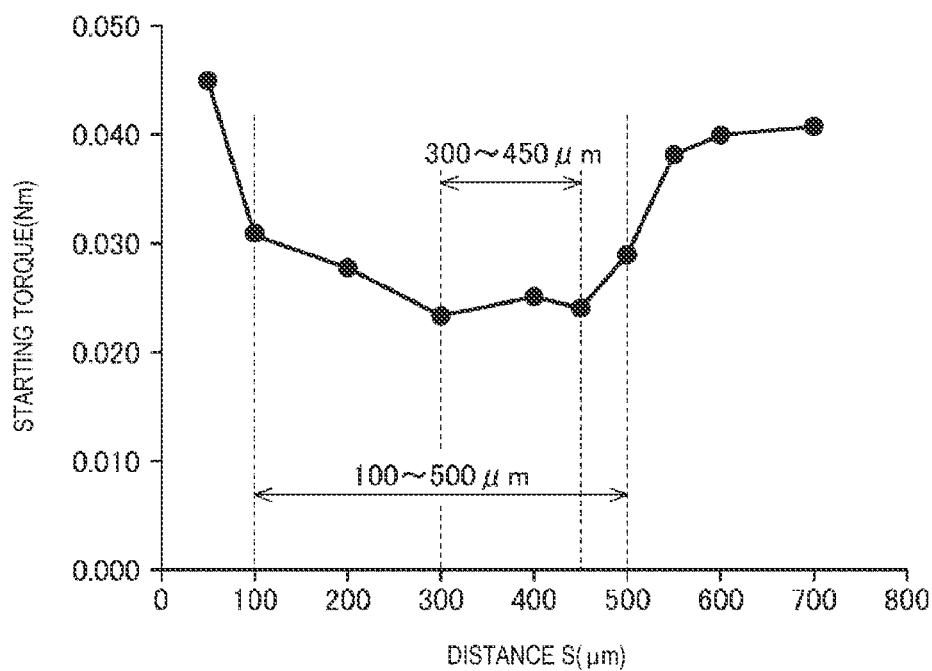
FIG. 11 is a graph showing a relationship between the distance and starting torque.

FIG. 10 is a graph showing a relationship between the distance S and the torque transmission efficiency. FIG. 11 is a graph showing a relationship between the distance S and starting torque. The horizontal axis in FIG. 10 and the horizontal axis in FIG. 11 respectively indicate the distance S, the vertical axis in FIG. 10 indicates the torque transmission efficiency, and the vertical axis in FIG. 11 indicates the starting torque.

As shown in FIG. 10, when the distance S is in the range from 100 µm to 500 µm, the torque transmission efficiency is about 67% or more in the gearing 10, and the sufficiently high torque transmission efficiency is obtained. Particularly, when the distance S is in the range from 300 µm to 450 µm, the better torque transmission efficiency of about 71% or more is obtained.

Note that the torque transmission efficiency is a rate of torque output from the output shaft to torque input to the input shaft of the gearing 10 at a number of revolutions of 2000 rpm.

As shown in FIG. 11, when the distance S is in the range from 100 μm to 500 μm, the starting torque is about 0.032 Nm or less in the gearing 10, and the sufficiently low starting torque is obtained. Particularly, when the distance S is in the range from 300 μm to 450 μm, the better starting torque of about 0.025 Nm or less is obtained.

Note that the starting torque refers to torque required for the stopped input shaft to move by 1°.

The above described external tooth convex pattern 7 may be formed using any method. The method of forming the external tooth convex pattern 7 includes e.g. machining such as cutting or grinding, rolling such as knurling, polishing such as sand-blasting or shot-blasting, and molding such as casting. The external tooth convex pattern 7 with high accuracy may be formed by the machining of the methods.

The projection height h of the convex portion 71 shown in FIG. 8 is not particularly limited, but preferably from 0.01 μm to 30 μm and more preferably from 0.10 μm to 10 μm. Thereby, the contact area between the internal teeth 23 and the external teeth 33 may be optimized. As a result, with the higher lubrication performance between the rigid gear 2 and the flexible gear 3, deformation such as a significant loss produced in the convex portion 71 may be suppressed and a large change in torque transmission characteristics may be suppressed. Here, the projection height h of the convex portion 71 refers to a distance between a top part of the convex portion 71 and a recessed bottom part formed between the convex portions 71 as shown in FIG. 8.

It is necessary that the extension directions of the convex portion 71 are the directions crossing the tooth trace 330, and the crossing angle between the extension directions of the convex portion 71 and the tooth trace 330 is preferably from 60° to 90° and the crossing angle is more preferably from 75° to 90°. Thereby, the retainability of the lubricant G may be further optimized.

As described above, the external tooth 33 includes the external tooth surface 331, and the tooth bottom surface 332 and the tooth end surface 333 coupled to the external tooth surface 331. The first convex portion 711 and the second convex portion 712 may be provided only in the external tooth surface 331, however, the first convex portion 711 and the second convex portion 712 shown in FIG. 8 may extend from the external tooth surface 331 to the tooth bottom surface 332 and the tooth end surface 333 as shown in FIG. 5, not only in the external tooth surface 331.

According to the configuration, the lubricant G located at the contact points 8 between one external tooth surface 331 and one facing internal tooth surface 231 and around the contact points 8 is easily moved to the contact points 8 adjacent in circumferential directions C via the tooth bottom surfaces 332. Similarly, the lubricant G located at the contact points 8 between one external tooth surface 331 and one facing internal tooth surface 231 is easily moved to the contact points 8 adjacent in the circumferential directions C via the tooth end surfaces 333. Thereby, the lubricant G may be spread over the whole flexible gear 3 more uniformly. As a result, local shortage of the lubricant G may be avoided and the life of the gearing 10 may be further extended. Note that the movement of the lubricant G is made particularly easily because a centrifugal force with the rotation of the flexible gear 3 serves as a drive force.

Figure 12:
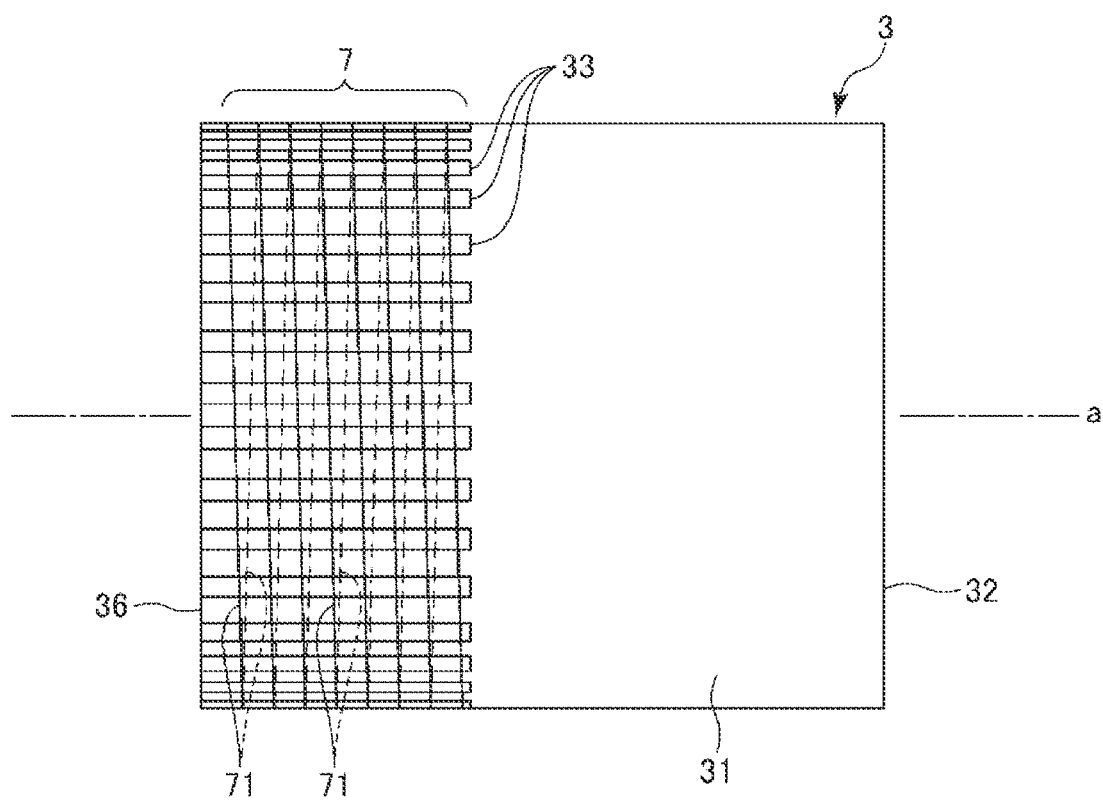
FIG. 12 is a plan view of the flexible gear shown in FIG. 5.

FIG. 12 is a plan view of the flexible gear 3 shown in FIG. 5. In the flexible gear 3 shown in FIG. 12, the convex portions 71 are continuously helically formed. That is, the plurality of convex portions 71 provided in one external tooth 33 are connected to one another via the other external teeth 33. Therefore, the external tooth convex pattern 7 shown in FIG. 12 helically extends about the axial line a (rotation axis).

According to the configuration, the concave portions formed between the convex portions 71 are helical continuous grooves. Therefore, the lubricant G easily moves to trace the concave portions. Thereby, the lubricant G may be spread over the whole flexible gear 3 more uniformly. As a result, the life of the gearing 10 may be further extended.

Further, the robot 100 according to the embodiment has the base 110 as the first member, the first arm 120 as the second member that pivots relative to the base 110, the gearing 10 that transmits the drive force for pivoting the first arm 120 relative to the base 110, and the motor 170 as the drive source that outputs the drive force to the gearing 10.

According to the configuration, the life is extended in the gearing 10, and the robot 100 saving the effort of maintenance with ease of handling may be realized.

An outer diameter of the flexible gear 3 is not particularly limited, but, when the outer diameter is equal to or smaller than 75 mm, the above described effect is more effective. Specifically, when the outer diameter of the flexible gear 3 is larger than 75 mm, the space inside of the flexible gear 3 is sufficiently large and a larger amount of lubricant G may be placed in advance. Then, a period in which the lubricant G flows out and is supplied to the contact points 8 and around the contact points 8 depends on the amount of lubricant G and is secured to be sufficiently long. On the other hand, when the outer diameter of the flexible gear 3 is equal to or smaller than 75 mm, the amount of lubricant G placed in advance is smaller. Particularly, in the range of the outer diameter, when a gearing of related art is used, a probability that the exhaustion of the lubricant G is earlier than the end of the life of the robot 100 is higher.

On the other hand, when the gearing 10 according to the embodiment is used, the retainability of the lubricant G at the contact points 8 and around the contact points 8 may be optimized, and a period until the lubricant G is exhausted may be secured to be sufficiently long. Thereby, even when the flexible gear 3 having a smaller outer diameter equal to or smaller than 75 mm is used, the life of the gearing 10 may be extended. Further, when the flexible gear 3 having the smaller diameter is used, the gearing 10 may be downsized. Thereby, the smaller diameter may contribute to downsizing of the robot 100. The outer diameter of the flexible gear 3 is preferably from 30 mm to 75 mm.

3. Gearing According to Second Embodiment

Next, a gearing according to a second embodiment will be explained.

Figure 13:
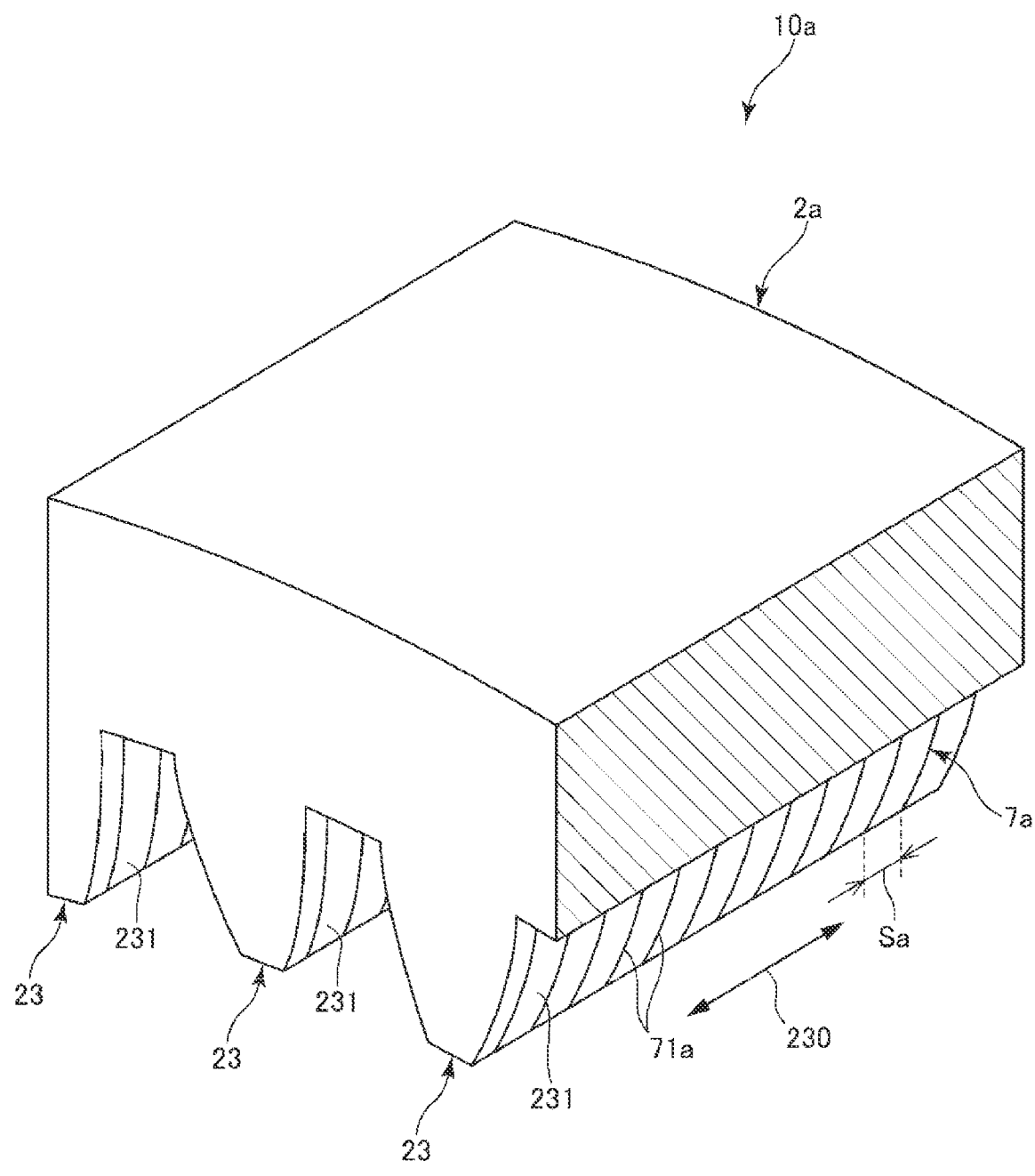
FIG. 13 is a partially sectional perspective view showing a gearing according to a second embodiment.

FIG. 13 is a partially sectional perspective view showing the gearing according to the second embodiment.

The embodiment is the same as the above described first embodiment except that the configuration of the rigid gear is different. In the following description, the embodiment will be explained with a focus on differences from the above described embodiment and the explanation of the same items will be omitted. In FIG. 13, the same configurations as those of the above described embodiment have the same signs.

As shown in FIG. 13, a rigid gear 2a (internal gear) of a gearing 10a according to the embodiment includes the internal teeth 23 having the internal tooth surfaces 231. The internal tooth surface 231 includes a same internal tooth convex pattern 7a as the above described external tooth convex pattern 7. The internal tooth convex pattern 7a has a plurality of convex portions 71a extending in directions crossing a tooth trace 230 of the internal tooth 23 e.g.

directions having a component in the radial directions R. The respective convex portions 71a extend substantially in parallel to one another and arranged in the axial directions A within the internal tooth surface 231. Therefore, the convex portions 71a are the same as the convex portions 71 except that the convex portions 71a are provided in the internal tooth surface 231. Further, the internal tooth convex pattern 7a is the same as the external tooth convex pattern 7 in that the pattern 7a includes the plurality of convex portions 71a.

Note that the distance S between the above described convex portions 71 is from 80 μm to 520 μm, and a distance Sa between the convex portions 71a is similarly preferably from 80 μm to 520 μm. Thereby, in the internal tooth surface 231, retainability of the lubricant G is increased and the lubricant G is held between the external tooth surface 331 and the internal tooth surface 231 more easily. As a result, the life of the gearing 10a may be further extended.

In the above described second embodiment, the same effects as those of the first embodiment may be obtained.

Note that the description of the external tooth convex pattern 7 according to the first embodiment can be applied to the internal tooth convex pattern 7a according to the embodiment. Further, the distance between the convex portions 71a of the rigid gear 2a is not necessarily limited to that in the above described range, but may be out of the range.

4. Gearing According to Third Embodiment

Next, a gearing according to a third embodiment will be explained.

Figure 14:
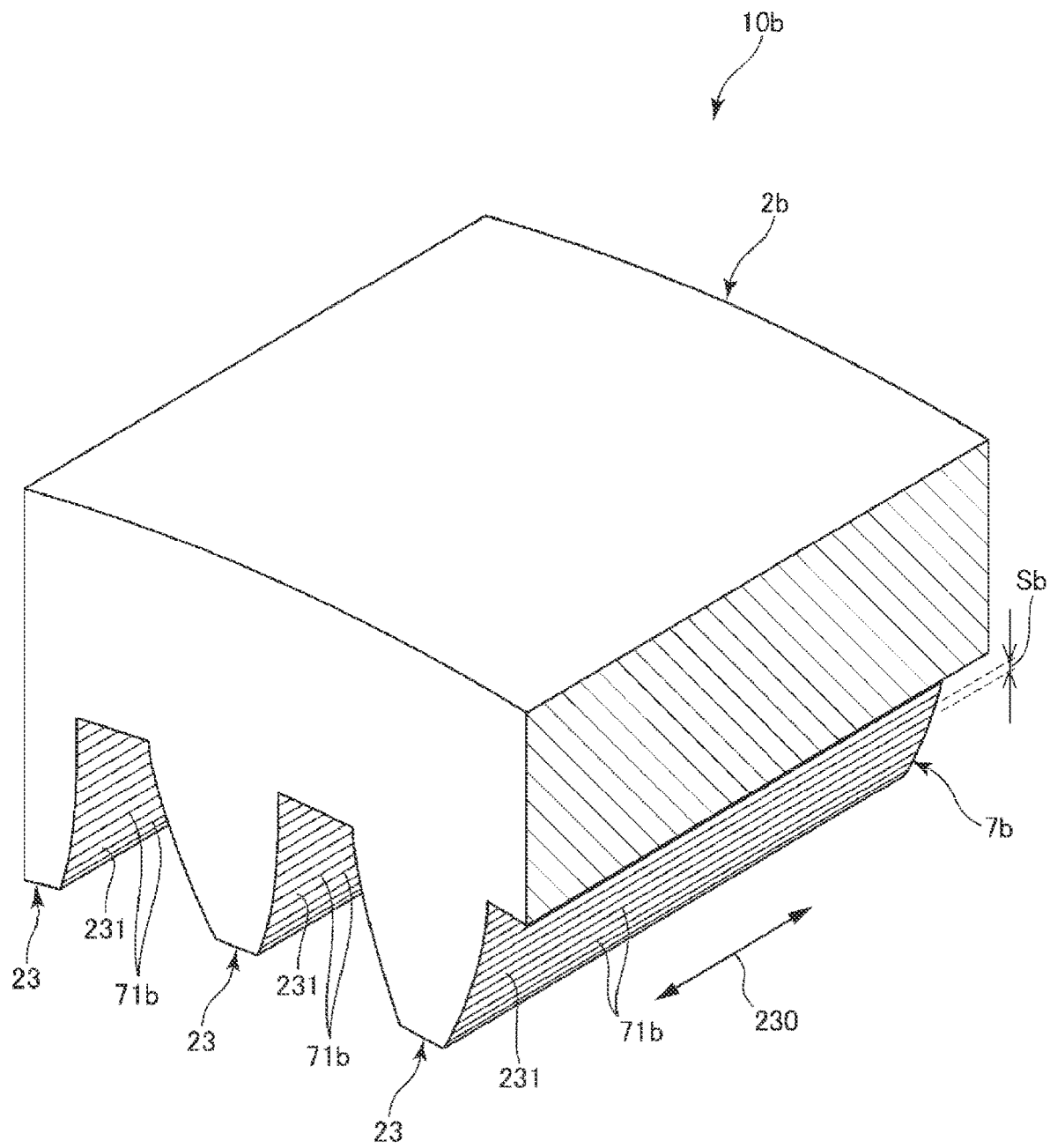
FIG. 14 is a partially sectional perspective view showing a gearing according to a third embodiment.

FIG. 14 is a partially sectional perspective view showing the gearing according to the third embodiment.

The embodiment is the same as the above described first embodiment except that the configuration of the rigid gear is different. In the following description, the embodiment will be explained with a focus on differences from the above described embodiments and the explanation of the same items will be omitted. In FIG. 14, the same configurations as those of the above described embodiments have the same signs.

As shown in FIG. 14, a rigid gear 2b (internal gear) of a gearing 10b according to the embodiment includes the internal teeth 23 having the internal tooth surfaces 231. The internal tooth surface 231 includes a different internal tooth convex pattern 7b from the above described external tooth convex pattern 7. The internal tooth convex pattern 7b has a plurality of convex portions 71b extending in directions having a component parallel to the tooth trace 230 of the internal tooth 23. The respective convex portions 71b extend substantially in parallel to one another. The internal tooth convex pattern 7b is different from the external tooth convex pattern 7 in that the pattern 7b includes the plurality of convex portions 71b.

According to the configuration, the extension directions of the convex portions 71 in the external tooth convex pattern 7 and the extension directions of the convex portions 71b in the internal tooth convex pattern 7b cross. That is, the extension directions of the convex portions 71b cross the flow of the lubricant G shown by the arrows A2 in FIGS. 7 and 8. Accordingly, the flow of the lubricant G from between the external tooth surface 331 and the internal tooth surface 231 out of the contact portions 8 may be suppressed by a centrifugal force with the rotation of the flexible gear 3. Thereby, the lubricant G may be easily held between the external tooth surface 331 and the internal tooth surface 231 and the life of the gearing 10b may be further extended.

Note that a distance Sb between the convex portions 71b is not particularly limited, but preferably from 10 μm to 100 μm and more preferably from 20 μm to 80 μm. In these ranges, the flow of the lubricant G along the convex portions 71b is minimized and the contact area of the internal tooth surface 231 with the external tooth surface 331 is secured, and thereby, lowering of the torque transmission efficiency may be suppressed.

In the above described third embodiment, the same effects as those of the first embodiment may be obtained.

5. Gearing According to Fourth Embodiment

Next, a gearing according to a fourth embodiment will be explained.

Figure 15:
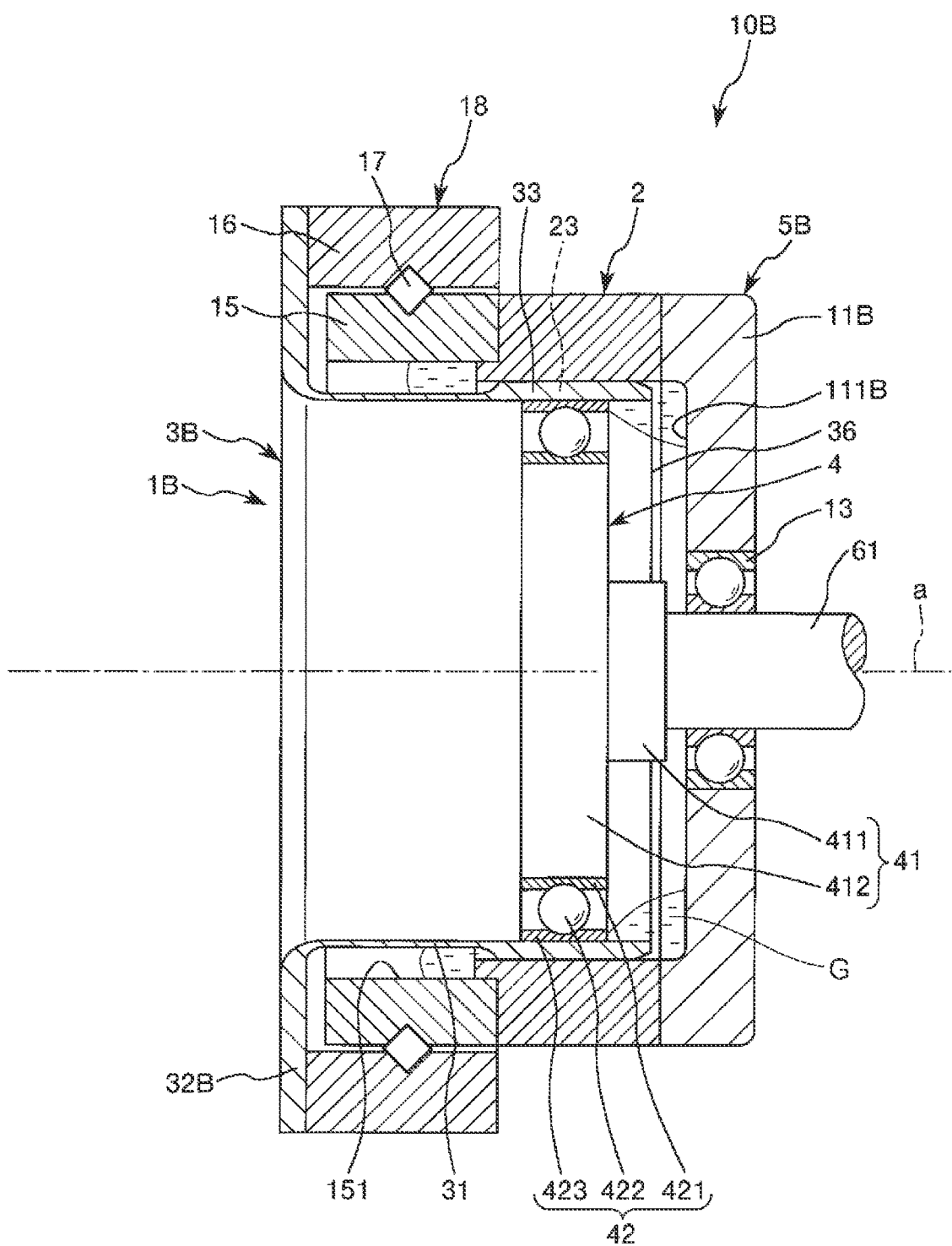
FIG. 15 is a longitudinal sectional view showing a gearing according to a fourth embodiment.

FIG. 15 is a longitudinal sectional view showing the gearing according to the fourth embodiment.

The embodiment is the same as the above described first embodiment except that the configuration of the flexible gear and the configuration of the case are different. In the following description, the embodiment will be explained with a focus on differences from the above described embodiments and the explanation of the same items will be omitted. In FIG. 15, the same configurations as those of the above described embodiments have the same signs.

A gearing 10B shown in FIG. 15 has a gearing main body 1B and a case 5B housing the gearing main body 1B. Note that the case 5B may be omitted.

The gearing 10B has a flexible gear 3B as an external gear in a hat shape placed inside of the rigid gear 2. The flexible gear 3B has a flange part 32B coupled to one end portion of the tubular barrel part 31 and projecting to the opposite side to the axial line a. An output shaft (not shown) is attached to the flange part 32B. The configuration of the external teeth 33 of the flexible gear 3B is the same as the external teeth 33 of the flexible gear 3 according to the first embodiment.

The case 5B has a lid body 11B substantially in a plate shape supporting e.g. the shaft 61 as the input shaft via the bearing 13 and a cross roller bearing 18 attached to the flange part 32B of the above described flexible gear 3B.

The lid body 11B is fixed to one side surface, i.e., on the right side in FIG. 15 of the rigid gear 2 by e.g. screws or the like. The cross roller bearing 18 has an inner ring 15, an outer ring 16, and a plurality of rollers 17 placed between the rings. The inner ring 15 is provided along the outer circumference of the barrel part 31 of the flexible gear 3 and fixed to the other side surface, i.e., on the left side in FIG. 15 of the rigid gear 2 by e.g. screws or the like. The outer ring 16 is fixed to the flange part 32B of the above described flexible gear 3B by e.g. screws or the like.

An inner wall surface 111B of the lid body 11B has a shape spreading in directions perpendicular to the axial line a to cover the opening part 36 of the flexible gear 3B. Further, an inner wall surface 151 of the inner ring 15 of the cross roller bearing 18 has a shape along the outer circumferential surface of the barrel part 31 of the flexible gear 3B.

In the above described fourth embodiment, the same effects as those of the first embodiment may be obtained.

As above, the gearing and the robot according to the present disclosure are explained based on the illustrated embodiments, however, the present disclosure is not limited to those. The configurations of the respective parts of the above described embodiments may be replaced by arbitrary configurations having the same functions. Further, another arbitrary configuration may be added to the above described embodiments.

In the above described embodiments, the base of the robot is "first member" and the first arm is "second member" and the gearing that transmits the drive force from the first member to the second member is explained, however, the present disclosure is not limited to those. The present disclosure can be applied to a gearing that transmits a drive force from one to the other of an nth arm and an (n+1)th arm wherein the nth arm is "first member" and the (n+1)th arm is "second member". Note that n is an integer equal to or larger than one. The present disclosure can be applied to a gearing that transmits a drive force from the second member to the first member.

Further, in the above described embodiments, the horizontal articulated robot is explained, however, the robot according to the present disclosure is not limited to that. For example, the number of joints of the robot is arbitrary, and the robot can be applied to a vertical articulated robot.

Furthermore, in the above described embodiments, the case where the gearing is incorporated in the robot is explained as an example, however, the gearing according to the present disclosure may be incorporated and used in various apparatuses having configurations that transmit drive forces from one sides to the other sides of the first members and the second members pivoting relative to each other.

What is claimed is:

1. A gearing comprising:
    an internal gear;
    a flexible external gear partially meshing with the internal gear and relatively rotating about a rotation axis to the internal gear; and
    a wave generator provided inside of the external gear and moving a mesh position between the internal gear and the external gear in a circumferential direction about the rotation axis, wherein
    the external gear includes an external tooth having an external tooth surface,
    the external tooth surface has an external tooth convex pattern including a first convex portion and a second convex portion extending in directions crossing directions of a tooth trace of the external tooth and arranged adjacent to each other in the directions of the tooth trace, and
    a distance between the first convex portion and the second convex portion is from 80 μm to 520 μm.

2. The gearing according to claim 1, wherein
    the distance between the first convex portion and the second convex portion is from 160 μm to 510 μm.

3. The gearing according to claim 1, wherein
    the distance between the first convex portion and the second convex portion is from 300 μm to 450 μm.

4. The gearing according to claim 1, wherein
    the external tooth includes the external tooth surface, and a tooth bottom surface and a tooth end surface coupling to the external tooth surface, and
    the first convex portion and the second convex portion extend from the external tooth surface to the tooth bottom surface and the tooth end surface.

5. The gearing according to claim 4, wherein
    the external tooth convex pattern helically extends around the rotation axis.

6. The gearing according to claim 1, wherein
    the internal gear includes an internal tooth having an internal tooth surface, and
    the internal tooth surface has a same internal tooth convex pattern as the external tooth convex pattern.

7. The gearing according to claim 1, wherein
    the internal gear includes an internal tooth having an internal tooth surface, and
    the internal tooth surface has a different internal tooth convex pattern from the external tooth convex pattern.

8. A robot comprising:
    a first member;
    a second member pivoting relative to the first member;
    the gearing according to claim 1, transmitting a drive force for pivoting the second member relative to the first member; and
    a drive source outputting the drive force to the gearing.

* * * * *